(12) United States Patent
Mahrenholz et al.

(10) Patent No.: US 8,991,872 B2
(45) Date of Patent: Mar. 31, 2015

(54) FLUID CONNECTION UNIT

(75) Inventors: John R. Mahrenholz, Peosta, IA (US); Matthew Davisdon, Dubuque, IA (US)

(73) Assignee: Deere & Company, Moline, IL (US)

( * ) Notice: Subject to any disclaimer, the term of this patent is extended or adjusted under 35 U.S.C. 154(b) by 814 days.

(21) Appl. No.: 13/161,860

(22) Filed: Jun. 16, 2011

(65) Prior Publication Data
US 2012/0319397 A1 Dec. 20, 2012

(51) Int. Cl.
*F16L 39/00* (2006.01)
(52) U.S. Cl.
CPC ...................................... *F16L 39/00* (2013.01)
USPC ........................................ 285/124.3; 285/19

(58) Field of Classification Search
USPC ..................... 285/124.3, 19, 20, 38
See application file for complete search history.

(56) References Cited

U.S. PATENT DOCUMENTS 6,595,552 B1 * 7/2003 Mortari .......................... 285/24

OTHER PUBLICATIONS

Background Information (1 page)(admitted as prior art before Jun. 16, 2011).

* cited by examiner

*Primary Examiner* — Aaron Dunwoody (57) ABSTRACT

A fluid connection unit comprises a quick-connect coupler fitting and a fitting mount. The coupler fitting is mounted to the fitting mount.

13 Claims, 6 Drawing Sheets

FLUID CONNECTION UNIT

FIELD OF THE DISCLOSURE

The present disclosure relates to a fitting mount of a fluid connection unit.

BACKGROUND OF THE DISCLOSURE

In general, quick-connect couplers are used, for example, in a fluid system (e.g., hydraulic, pneumatic) to connect fluid lines quickly. Connection occurs without fluid leakage. Such couplers having two mating parts: the male quick-connect coupler fitting (i.e., plug) and the female quick-connect coupler fitting.

Quick-connect couplers can be used under a variety of pressure and temperature conditions. Quick-connect couplers are particularly suitable for use in applications where fluid loss during connection or disconnection is undesirable. Typical applications include systems where tools or other devices are routinely connected and disconnected to a central pressure supply. Common types of working fluids include pneumatic, hydraulic, steam, water, oil, fuel, chemical, gas, or solid transfer.

It is known to provide a work vehicle, such as a high-speed dozer or off-road vehicle, with auxiliary attachments (e.g., a ripper) to the vehicle. Auxiliary hydraulic connection points, in the form of female quick-connect coupler fittings, have been provided for use with such auxiliary attachments. The coupler fittings are secured to a fitting mount so as to be constrained axially and radially relative to their respective central axes and the fitting mount (operators also prefer them to be constrained rotationally relative to their respective axes and the fitting mount). The fitting mount has been included in a bulkhead of the vehicle, such as at the rear of the vehicle.

An auxiliary attachment may be coupled hydraulically to the vehicle to operate the attachment. Male quick-connect coupler fittings may be coupled to the female quick-connect coupler fittings to connect the hydraulic supply and return lines.

SUMMARY OF THE DISCLOSURE

According to the present disclosure, a fluid connection unit comprises a quick-connect coupler fitting and a fitting mount. The fitting mount comprises a bracket, a key, and a fastener. The bracket comprises a first plate and a second plate. The first and second plates are secured to one another. The first plate comprises a first through-hole. The second plate comprises a second through-hole. The coupler fitting is positioned in the first and second through-holes such that the coupler fitting is constrained radially therearound relative to a central axis of the coupler fitting parallel to a dimension of the fitting mount and relative to the bracket. The key is positioned between the first and second plates relative to the dimension and secured to the second plate with the fastener, which extends along its length in the dimension between the second plate and the key, such that the key and the first plate engage the coupler fitting so as to constrain the coupler fitting axially relative to the central axis and the bracket.

The above and other features will become apparent from the following description and the attached drawings.

BRIEF DESCRIPTION OF THE DRAWINGS

The detailed description of the drawing refers to the accompanying figures in which.

DETAILED DESCRIPTION OF THE DRAWINGS

Figure 1:
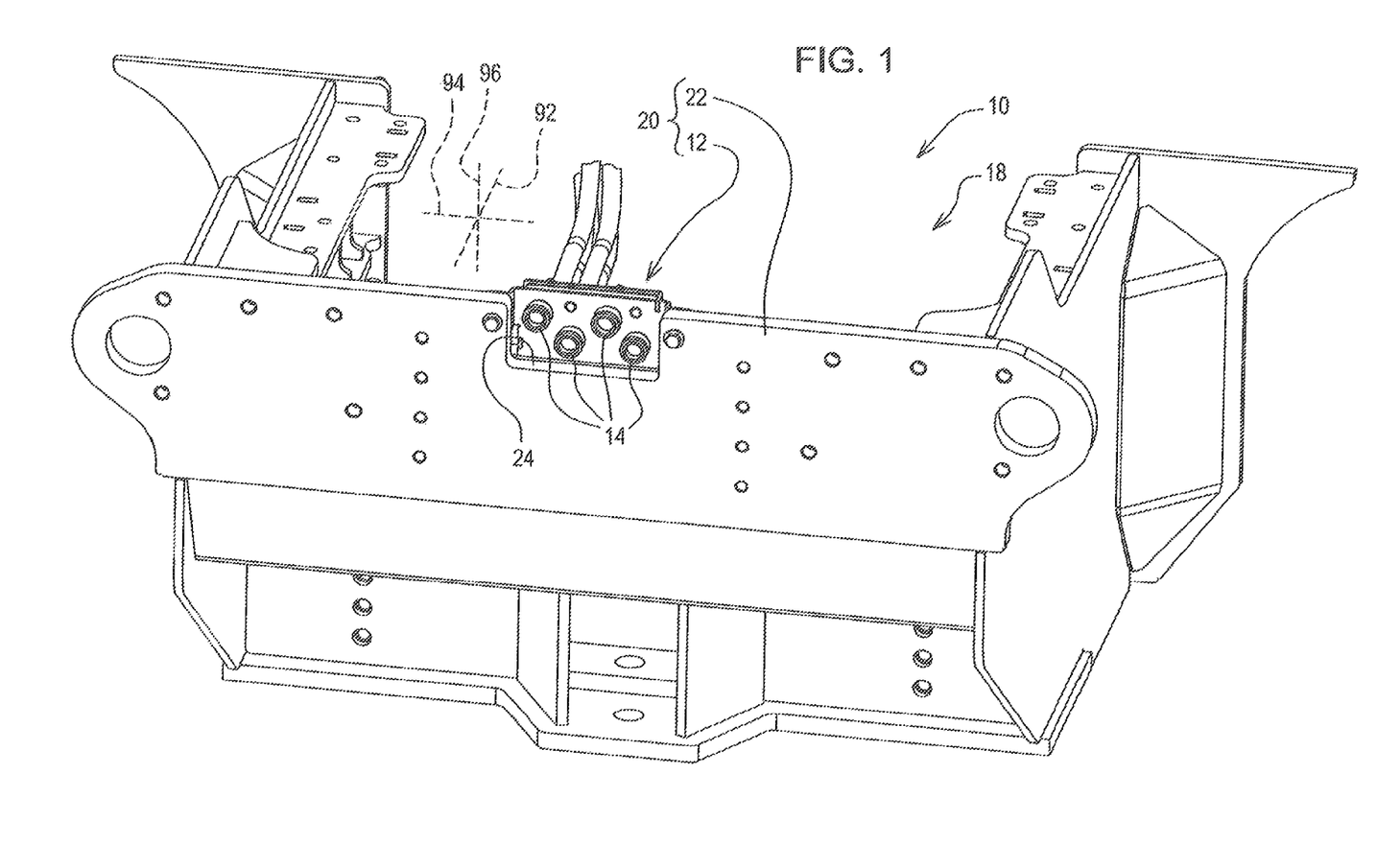
FIG. 1 is a perspective view showing the rear of a vehicle having a fluid connection unit for use with an auxiliary attachment to the vehicle.
Figure 2:
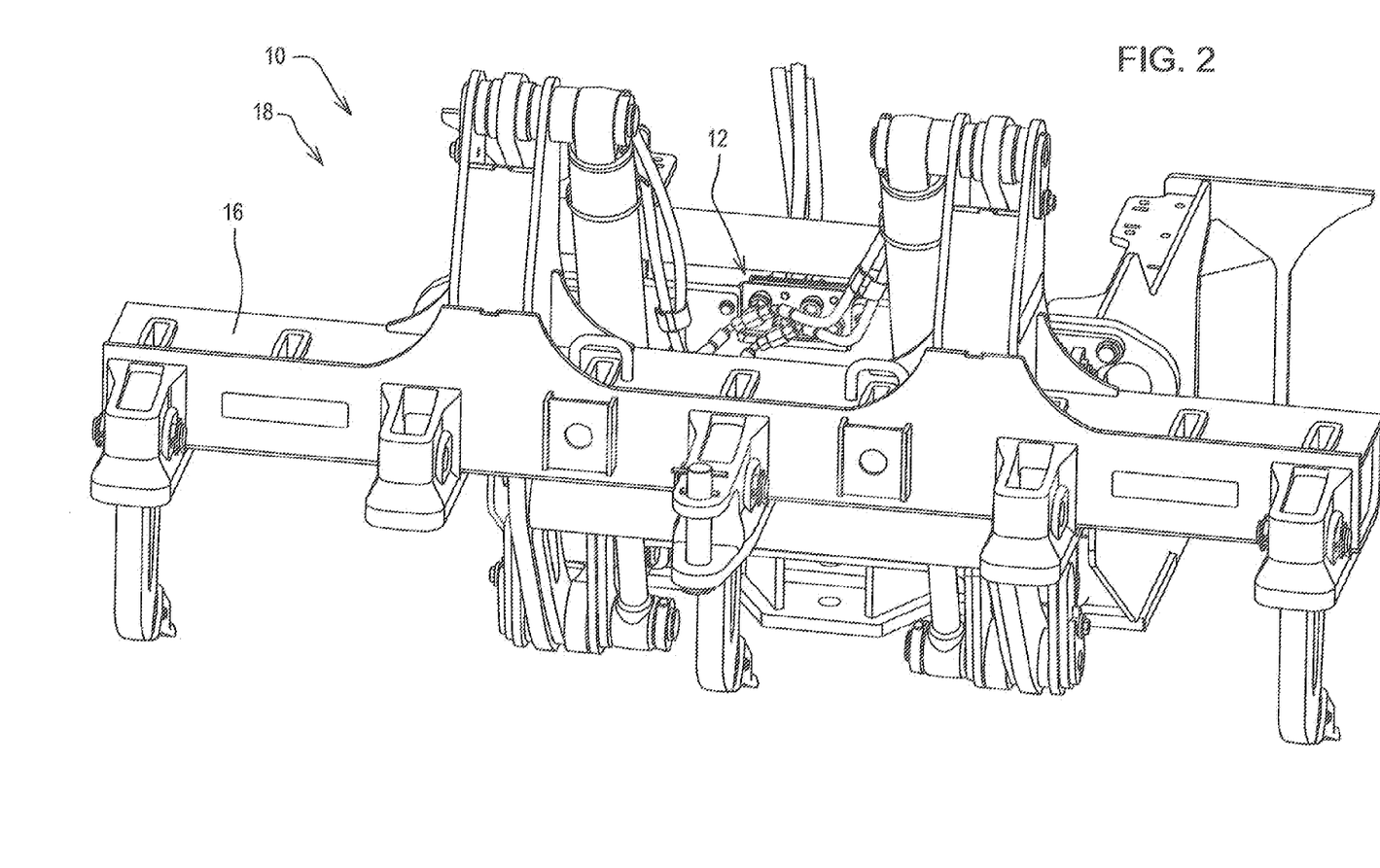
FIG. 2 is a perspective view showing an auxiliary attachment coupled fluidly to the fluid connection unit.

Referring to FIGS. 1 and 2, there is shown a vehicle 10 having a fluid connection unit 12 in the form of, for example, an auxiliary hydraulic connection gallery. The unit 12 has a number of quick-connect coupler fittings 14 (e.g., four female quick-connect coupler fittings) that may provide hydraulic connection points for hydraulically operating an auxiliary attachment 16 to the vehicle 10.

The vehicle 10 may be any type of vehicle. Illustratively, it may be a work vehicle in the form of, for example, a high-speed dozer. In such a case, the vehicle may be an articulated vehicle with a front section and a rear section 18. The front and rear sections may be articulated to one another, and each section may have a traction element on either side in the form of, for example, a track.

Figure 3:
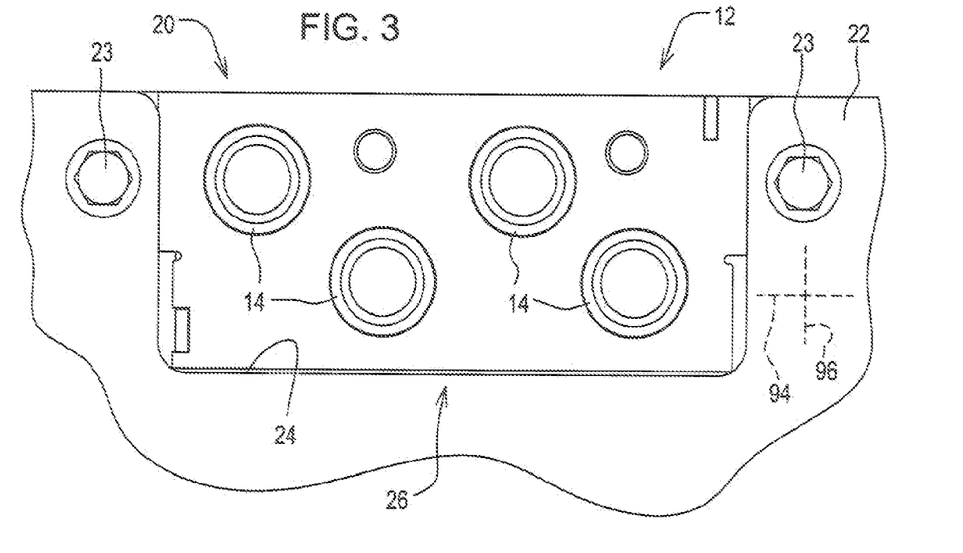
FIG. 3 is a rear elevation view showing the fluid connection unit mounted to a heavy-duty plate of a bulkhead.
Figure 4:
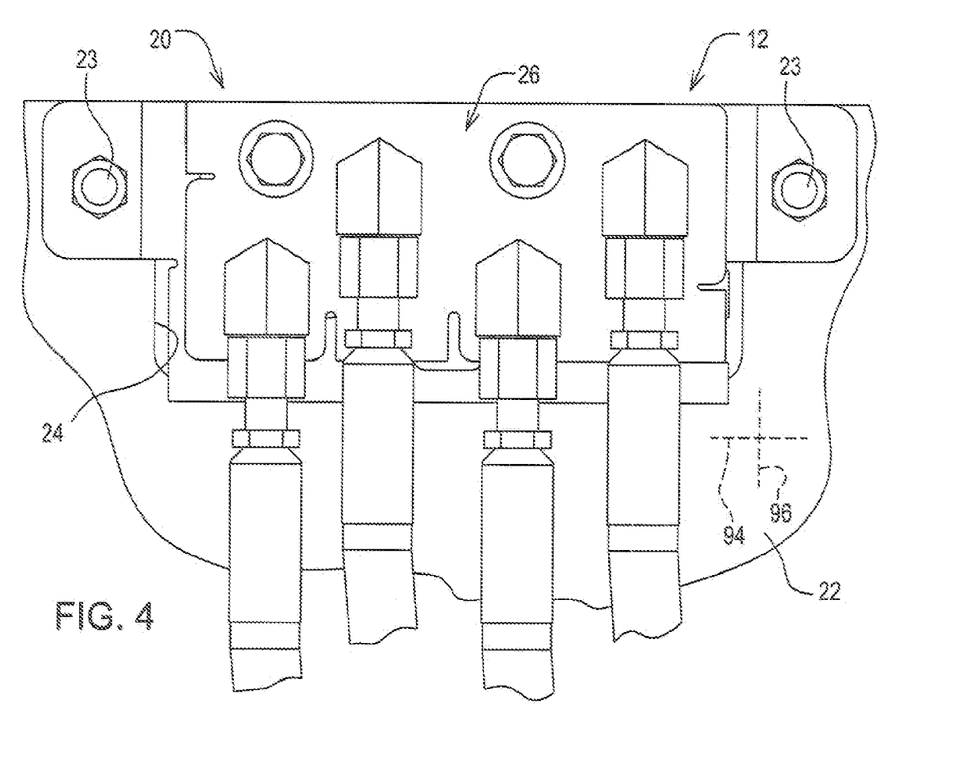
FIG. 4 is a front elevation view showing the fluid connection unit mounted to the heavy-duty plate.
Figure 5:
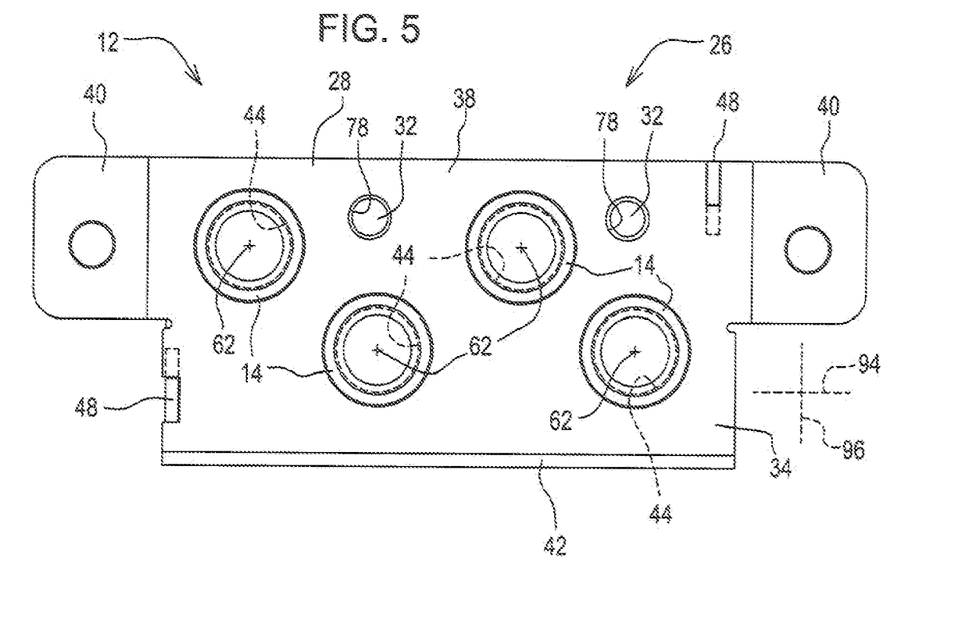
FIG. 5 is a rear elevation view of the fluid connection unit.
Figure 6:
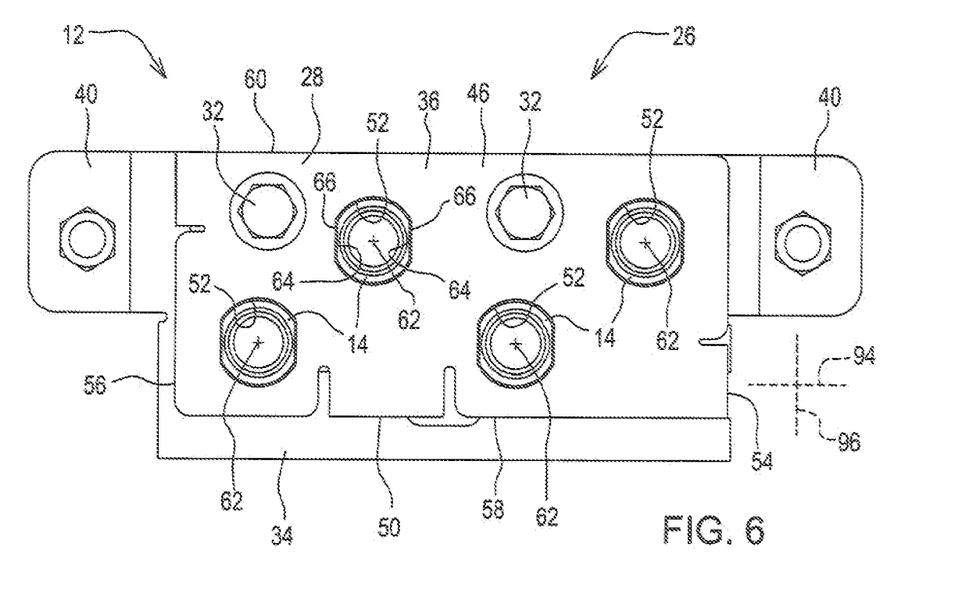
FIG. 6 is a front elevation view of the fluid connection unit.
Figure 7:
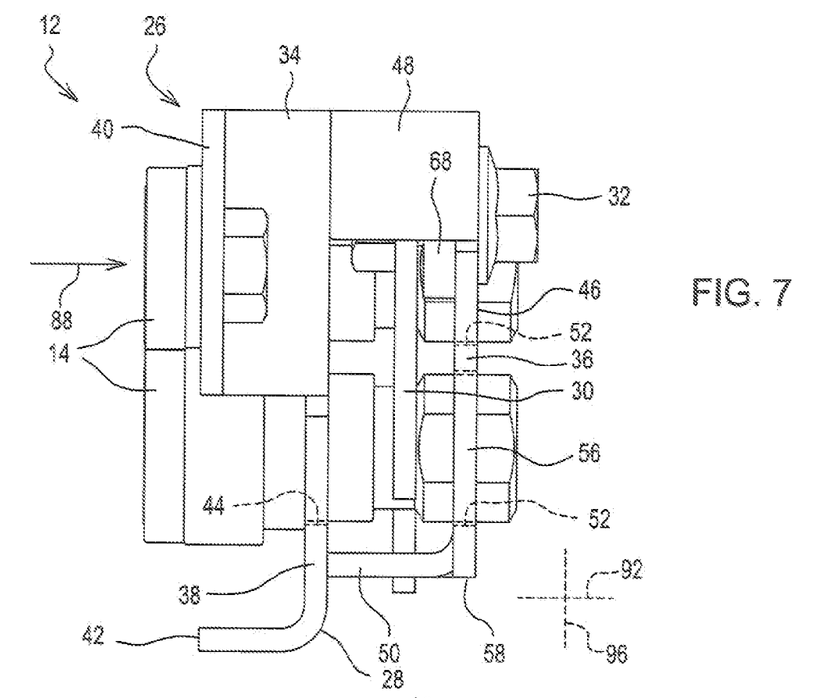
FIG. 7 is a right-side elevation view of the fluid connection unit.
Figure 8:
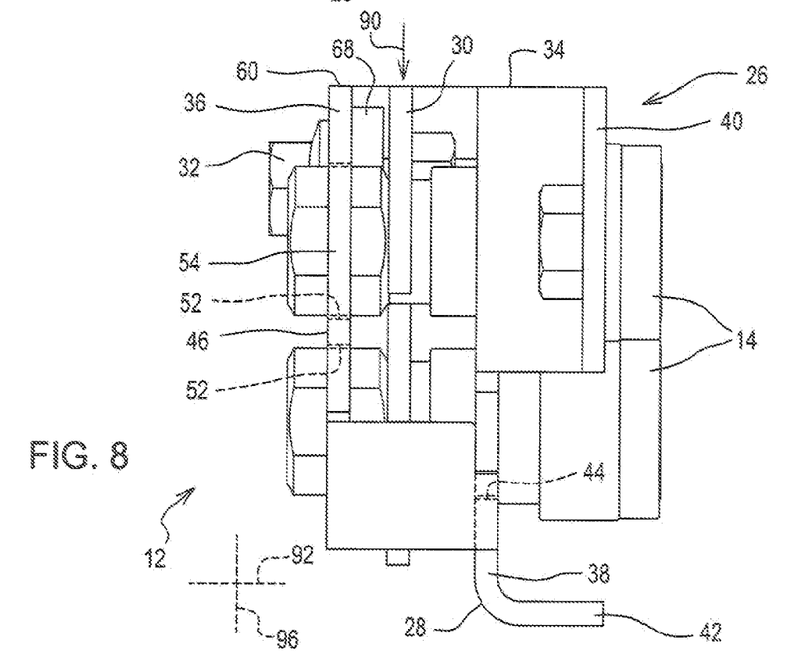
FIG. 8 is a left-side elevation view of the fluid connection unit.

Referring to FIGS. 2-4, the rear of the rear section 18 may be configured for mounting of an auxiliary attachment 16, shown, for example, as a ripper in FIG. 2. The fluid connection unit 12 may be included in a bulkhead 20 between the interior and exterior of the vehicle 10, in particular between the interior and exterior of the rear section 18. The bulkhead 20 may include a heavy-duty plate 22 made, for example, of a steel and included in the frame of the rear section 18. The unit 12 may be secured to the interior of the plate 22 using two fasteners 23 (e.g., cap screws and corresponding nuts). A rear side of the unit 12 may be exposed to the exterior of the vehicle 10 through a notch 24 of the plate 22 such that the unit 12 covers the notch 24. The attachment 16 may be fastened to the plate 22.

Hydraulic lines exterior to the vehicle 10 may be coupled fluidly to respective coupler fittings 14 of the unit 12 to operate hydraulic cylinders of the attachment 16. The coupler fittings 14 may be configured, for example, as female fittings. As such, the exterior hydraulic lines may have plugs (i.e., male quick-connect coupler fittings) that mate with the respective female quick-connect coupler fittings 14. Hydraulic lines interior to the vehicle 10 may be coupled fluidly to respective coupler fittings 14.

Referring to FIGS. 5-10, the fluid connection unit 10 may have a fitting mount 26 to which the coupler fittings 14 are secured. The fitting mount 26 may have a bracket 28, a key 30, and a number of fasteners 32 (e.g., two). The fitting mount 26 may have a first or fore-aft dimension 92, a second or lateral dimension 94, and a third or vertical dimension 96, the dimension 92, 94, 96 being mutually perpendicular.

The bracket 28 may have a first or rear plate 34 and a second or front plate 36 forward of the rear plate 34 in the fore-aft dimension 92. The rear plate 34 may be fastened to the plate 22 of the bulkhead 20 with the fasteners 23. The rear plate 34 may be a monolithic structure made, for example, of a steel and may have a panel 38, an L-shaped first or left mounting tab 40, an L-shaped second or right mounting tab 40, and an engagement tab 42. The left and right mounting tabs 40 may be spaced laterally apart from one another relative to the lateral dimension 94.

The panel 38 may have a number of through-holes 44 (e.g., four), one for each coupler fitting 14. Adjacent through-holes 44 may be staggered vertically in the vertical dimension 96 and laterally in the lateral dimension 94. A coupler fitting 14 may be positioned in each of the through-holes 44. The panel 38 may have a first or left edge, a second or right edge, a third or bottom edge, and a fourth or top edge. The left and right edges may be opposite to one another in the lateral dimension 94, and the bottom and top edges may be opposite to one another in the vertical dimension 96.

The left and right mounting tabs 40 may be secured respectively to the left and right edges of the rear plate 34. Each mounting tab 40 may have a proximal portion and a distal portion, the proximal and distal portions perpendicular to one another. The proximal portion of the left mounting tab 40 may be secured to the left edge of the panel 38 so as to angle rearwardly relative to the fore-aft dimension 92 and perpendicularly from the panel 38 toward the heavy-duty plate 22. The distal portion of the left mounting tab 40 may angle laterally outwardly relative to the lateral dimension 94 and perpendicularly from the proximal portion of the left mounting tab 40 along a front surface of the plate 22. A left fastener 23 may have a cap screw and a nut, with the cap screw extending in the fore-aft dimension 92 through a through-hole of the plate 22 and a through-hole of the proximal portion of the left mounting tab 40 into the nut which may be welded to that proximal portion.

The proximal portion of the right mounting tab 40 may be secured to the right edge of the panel 38 so as to angle rearwardly relative to the fore-aft dimension 92 and perpendicularly from the panel 38 toward the heavy-duty plate 22. The distal portion of the right mounting tab 40 may angle laterally outwardly relative to the lateral dimension 94 and perpendicularly from the proximal portion of the right mounting tab 40 along a front surface of the plate 22. A right fastener 23 may have a cap screw and a nut, with the cap screw extending through a through-hole of the plate 22 and a through-hole of the proximal portion of the right mounting tab 40 into the nut which may be welded to that proximal portion.

The engagement tab 42 of the rear plate 34 may be secured to the bottom edge of the panel 38. The engagement tab 42 may angle rearwardly relative to the fore-aft dimension 92 and perpendicularly from the panel 38 into engagement with the front surface of the heavy-duty plate 22 below the notch 24.

The front plate 36 may be a monolithic structure made, for example, of a steel and may have a panel 46, a first or left mounting tab 48, a second or right mounting tab 48, and a third or attachment tab 50, the left and right mounting tabs 48 being spaced apart from one another relative to the fore-aft dimension 92.

The panel 46 may have a number of through-holes 52 (e.g., four), one for each coupler fitting 14. Adjacent through-holes 52 may be staggered vertically relative to the vertical dimension 96 and laterally relative to the lateral dimension 94. A coupler fitting 14 may be positioned in each of the through-holes 52. The panel 46 may have a first or left edge 54, a second or right edge 56, a third or bottom edge 58, and a fourth or top edge 60. The left and right edges 54, 56 may be opposite to one another relative to the lateral dimension 94, and the bottom and top edges 58, 60 may be opposite to one another relative to the vertical dimension 96.

The rear and front plates 34, 36 may be secured to one another. The left and right mounting tabs 48 may be secured respectively to the left and right edges 54, 56 of the panel 46 so as to angle rearwardly relative to the fore-aft dimension 92 and perpendicularly from the panel 46 to the rear plate 34. The left mounting tab 48 may have a distal tip which fits into a notch of the left edge of the panel 38 of the rear plate 34 such that the left mounting tab 48 interlocks with the rear plate 34 upon welding of the left mounting tab 48 to the rear plate 34. The right mounting tab 48 may have a distal tip which fits into a notch of the top edge of the panel 38 of the rear plate 34 such that the right mounting tab 48 interlocks with the rear plate 34 upon welding of the right mounting tab 48 to the rear plate 34. The left and right mounting tabs 48 may extend respectively from the bottom and top edges 58, 60, promoting the stability of the front plate 36. The laterally inner interface between each tab 48 and the panel 38 of the rear plate 34 relative to the lateral dimension 94 may be welded together.

The attachment tab 50 may be secured to the bottom edge 58. The tab 50 may angle rearwardly relative to the fore-aft dimension 92 and perpendicularly from the panel 46. The tab 50 may provide an attachment point for the key 30 as discussed in more detail herein. The bottom interface between the attachment tab 50 and the panel 38 of the rear plate 34 may be welded together.

Each coupler fitting 14 may be constrained radially and rotationally relative to its central axis 62 and the bracket 28. The through-holes 44 of the rear plate 34 may be aligned respectively with the through-holes 52 of the front plate 36. Each coupler fitting 14 may be positioned in a respective through-hole 44 and a respective through-hole 52, such that the coupler fitting 14 is constrained radially therearound relative to the central axis 62 of the coupler fitting 14 and the bracket 28. Each through-hole 52 of the front plate 36 may have two flat edges 64 diametrically opposite to one another, and each coupler fitting 14 may have two flat portions 66 diametrically opposite to one another and mating respectively with the flat edge 64 so as to constrain the coupler fitting 14 rotationally relative to its axis 62 and the bracket 28, as shown, for example, with respect to one of the coupler fittings 14 in FIG. 6.

The key 30 may be used to constrain the coupler fittings 14 axially relative to their axes 14 and the bracket 28. The key 30 may be positioned about the coupler fittings 14 between the rear and front plates 34, 36 relative to the fore-aft dimension 92. The key 30 may be secured to the front plate 36 with the fastener 32, each of which may extend along its length in the fore-aft dimension 92 between the front plate 36 and the key 30, such that the key 30 and the rear plate 34 engage the coupler fittings 14 so as to constrain each coupler fitting 14 axially relative to its axis 62 and the bracket 28. The axes 62 may be parallel to one another and to the fore-aft dimension 92.

Figure 11:
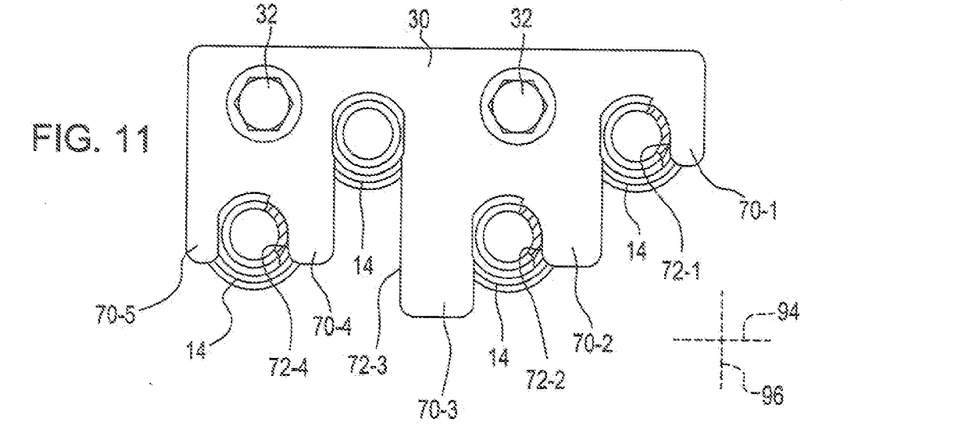
FIG. 11 is a front elevation view showing a key of the fluid connection unit.

Referring to FIG. 11, the key 30 may have an edge, exemplarily the bottom edge, profiled to define a number of fingers and a number of notches, such as, for example, fingers 70-1, 70-2, 70-3, 70-4, 70-5 and notches 72-1, 72-2, 72-3, 72-4. The fingers 70 may depend in the vertical dimension 96 from an upper portion of the key 30. Adjacent fingers 70 may cooperate to provide therebetween a respective notch 72 in which a respective coupler fitting 14 is positioned.

Figure 9:
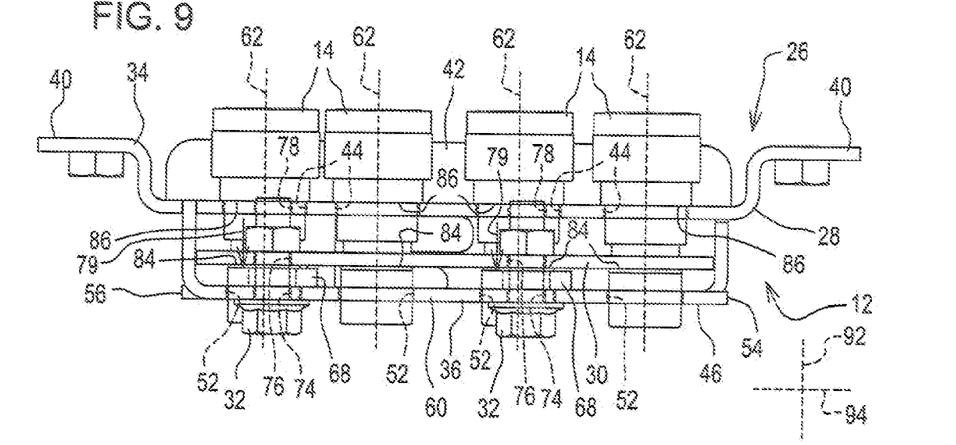
FIG. 9 is a top plan view of the of the fluid connection unit.

Referring to FIG. 9, the key 30 may be secured to the front plate 36 with the first or left fastener 32 and the second or right fastener 32. The left and right fasteners 32 may be spaced laterally apart from one another relative to the lateral dimension 94. Each fastener 32 may have a cap screw positioned in a respective through-hole 74 of the front plate 36, a respective through-hole 76 of the key 30, and a respective through-hole 78 of the rear plate 34, such through-holes 74, 76, 78 being aligned with one another. Each fastener 32 may have a nut welded to a rear surface of the key 30, positioned about the respective through-hole 76, and receiving the cap screw of that fastener 32.

As the fasteners 32 are tightened, the fingers 70 may be urged forwardly against the coupler fittings 14, thereby urging the coupler fittings 14 against the rear plate 34. The fingers 70 may extend into respective grooves of the coupler fittings 14 in order to engage respective front shoulders 84 of the coupler fittings 14. Tightening of the fasteners 32 may urge the fingers 70 against the respective front shoulders 84, thereby urging rear shoulders 86 against the rear plate 34, constraining the coupler fittings 14 axially relative to their respective axes 62 and the bracket 28. The key 30 and the rear plate 34 may engage the coupler fittings 14 so as to constrain them axially relative to their axes 62 and the bracket 28.

The bracket 28 may have a first or left spacer 68 and a second or right spacer 68, the spacers 68 spaced laterally apart from one another relative to the lateral dimension 94. The spacers may be positioned between the front plate 36 and the key 30 relative to the fore-aft dimension 92 so as to limit deformation of the key 30 relative to the fore-aft dimension 92 upon tightening of the fasteners 32. The spacers 68 may be mounted (e.g., welded) to the front plate 36, such as, for example, to a rear surface of the panel 46 of the front plate 36. Alternatively, the spacers 68 may be mounted (e.g., welded) to the key 30, such as, for example, to a front surface of the key 30. The spacers 68 may be configured as unthreaded rings made, for example, of a steel. The fasteners 32 may extend respectively through central holes of the spacers 68, and may draw the key 30 into engagement with the spacers 68 (i.e., a front surface of the key 30 into engagement with a rear surface of each spacer 68) upon tightening of the fasteners 32, as indicated by the arrows 79, thereby limiting deformation of the key 30 relative to the fore-aft dimension 92. Such engagement between the key 30 and the spacers 68 is the anticipated mode of operation, although it is possible for the key 30 not to touch the spacers 68.

Referring to FIG. 11, each finger 70 may extend to a respective coupler fitting 14. Exemplarily, each finger may extend to the bottom of a respective flat portion 66 of a respective coupler fitting 14. Each finger 70 may stop at the bottom of that flat portion 66, except the finger 70-3. The finger 70-3 may extend beyond the coupler fittings 14 to the attachment tab 50.

Figure 10:
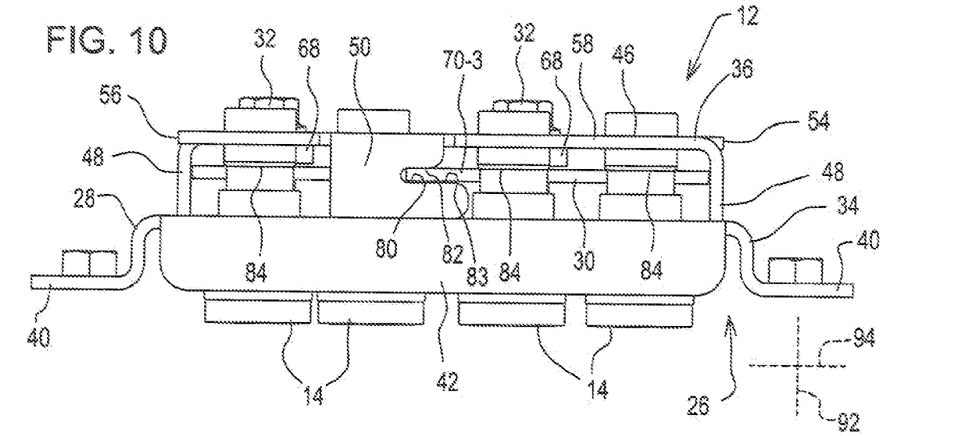
FIG. 10 is a bottom view of the fluid connection unit.

Referring to FIG. 10, the key 30 may engage the bracket 28 upon tightening of the fasteners 32. The finger 70-3 may engage the attachment tab 50. The attachment tab 50 may have a hole 80 illustratively in the form of, for example, a notch, and the finger 70-3 may extend into the hole 80 so as to engage the hole 80 upon tightening of the fasteners 32, establishing another point of attachment with the front plate 36 to help hold the unit 12 together, the fasteners 32 providing two other points of attachment. Upon tightening of the fasteners 32, it is thought that a bottom portion of the finger 70-3 may nominally engage a front edge 82 of the hole 80 with a nominal clearance between the bottom portion of the finger 70-3 and a rear edge 83 of the hole 80 (e.g., nominal clearance of 0.5 millimeter), or the coupler fittings 14 may act like a fulcrum urging the bottom portion of the finger 70-3 slightly rearwardly away from its nominal position (i.e., in engagement with the front edge 82) into engagement with a rear edge 83 of the hole 80 such that the nominal clearance is in front of the bottom portion of the finger 70-3. The finger 70-3 may thus interlock with the attachment tab 50. The key 30 may be a monolithic structure, such as, for example, a plate made, for example, of a steel. The hole 80 could be enclosed with sufficient tolerancing to receive the finger 70-3.

During assembly, the bracket 28 may be mounted to the plate 22 with the fasteners 23. The coupler fittings 14 may then be loaded from the rear into the bracket 28 in a direction indicated by arrow 86 (FIG. 7), i.e., forwardly relative to the fore-aft dimension 92. Each fitting 14 may be loaded into a respective through-hole 44 of the rear plate 34 and a respective through-hole 52 of the front plate 36 so as to constrain the coupler fitting 14 radially therearound relative to its respective axis 62 and the bracket 28. Two flat portions 66 of each coupler fitting 14 may mate with two flat edges 64 of the respective through-hole 52 so as to constrain that coupler fitting 14 rotationally relative to its axis 62 and the bracket 28.

The key 30 may be inserted between the rear and front plates 34,36 relative to the fore-aft dimension 92, in a direction indicated by the arrow 90 (FIG. 8), i.e., downwardly relative to the vertical dimension 94. The finger 70-3 may be inserted into the hole 80. Each coupler fitting 14 may be received within a respective notch 72 of the key 30. The key 30 may be secured to the front plate 36 with the fasteners 32, each extending along its length relative to the fore-aft dimension 92 between the front 36 and the key 30, such that the key 30 and the rear plate 34 engage the coupler fittings 14 so as to constrain the coupler fittings 14 axially relative to the respective axes 62 and the bracket 28. The finger 70-3 may engage the attachment tab 50.

The construction of the fitting mount 26 may promote its manufacturability and the ready and intuitive installation and serviceability of the coupler fittings 14. Such installation and servicing may be done by one person, promoting assembly time efficiency.

For the sake of providing an example, the fluid connection unit 12 has been discussed in connection with the vehicle 10 as providing hydraulic connection points. However, it is understood that the unit 12 may be used in a wide variety of applications with a wide variety of fluids (hydraulic, pneumatic, etc.).

For ease of illustration, threads of the fasteners and welds have not been shown, but are to be understood.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:
1. A vehicle with a fluid connection unit, the vehicle comprising:
   a bulkhead comprising a plate,
   a quick-connect coupler fitting, and a fitting mount comprising a bracket, a key, and a fastener, the bracket comprising a first plate and a second plate, the first and second plates secured to one another, the first plate comprising a first through-hole, the second plate comprising a second through-hole, the coupler fitting positioned in the first and second through-holes such that the coupler fitting is constrained radially therearound relative to a central axis of the coupler fitting parallel to a dimension of the fitting mount and relative to the bracket, the key positioned between the first and second plates relative to the dimension and secured to the second plate with the fastener, which extends along its length in the dimension between the second plate and the key, such that the key and the first plate engage the coupler fitting so as to constrain the coupler fitting axially relative to the central axis and the bracket, wherein the first plate of the bracket is secured to the plate of the bulkhead so as to cover a notch of the plate of the bulkhead.

2. The vehicle with a fluid connection unit of claim 1, wherein the second through-hole comprises a flat edge, and the coupler fitting comprises a flat portion mating with the flat edge so as to constrain the coupler fitting rotationally relative to the central axis and the bracket.

3. The vehicle with a fluid connection unit of claim 1, wherein the key is configured as a third plate.

4. The vehicle with a fluid connection unit of claim 1, wherein the key contacts the bracket.

5. The vehicle with a fluid connection unit of claim 4, wherein the key comprises a finger, the second plate comprises a tab, and the finger engages the tab.

6. The vehicle with a fluid connection unit of claim 4, wherein the second plate comprises a panel and a tab angled relative to the panel, the panel comprises the second through-hole, the tab comprises a hole, and the key comprises a finger extending into the hole.

7. The vehicle with a fluid connection unit of claim 6, wherein the finger is a first finger, the key comprises a second finger, the first and second fingers cooperate to provide therebetween a notch in which the coupler fitting is positioned.

8. The vehicle with a fluid connection unit of claim 1, wherein the fastener is positioned in through-holes of each of the first plate, the second plate, and the key.

9. The vehicle with a fluid connection unit of claim 1, wherein the key engages a first shoulder of the coupler fitting, and the first plate engages a second shoulder of the coupler fitting.

10. The vehicle with a fluid connection unit of claim 1, wherein the dimension is a first dimension, the fitting mount has a second dimension and a third dimension, the first, second, and third dimensions are mutually perpendicular, the second plate comprises a panel, a first tab, a second tab, and a third tab, the panel comprises a first edge, a second edge, a third edge, and a fourth edge, the first and second edges are opposite to one another relative to the second dimension, the third and fourth edges are opposite to one another relative to the third dimension, the first tab is secured to the first edge and the first plate so as to angle from the panel to the first plate in the first dimension, the second tab is secured to the second edge and the first plate so as to angle from the panel to the first plate in the first dimension, the third tab is secured to the third edge so as to angle from the panel in the first dimension, and the key comprises a finger engaging the third tab.

11. The vehicle with a fluid connection unit of claim 10, wherein the fastener is a first fastener, the fitting mount comprises a second fastener, and the key is secured to the second plate with the first and second fasteners, each of the first and second fasteners extends along its length in the first dimension between the second plate and the key, and the first and second fasteners are spaced apart from one another relative to the second dimension.

12. The vehicle with a fluid connection unit of claim 1, wherein the bracket comprises a spacer positioned between the second plate and the key to limit deformation of the key relative to the dimension upon tightening of the fastener.

13. The vehicle with a fluid connection unit of claim 12, wherein the fastener extends through the spacer.

* * * * *